(12) United States Patent
Haufe

(10) Patent No.: US 12,732,068 B2
(45) Date of Patent: Sep. 8, 2026

(54) SHIELDING STRUCTURE FOR A DRIVE DEVICE, PRESSURE GENERATOR FOR A BRAKE SYSTEM

(71) Applicant: Robert Bosch GmbH, Stuttgart (DE)

(72) Inventor: Benjamin Haufe, Obersulm Willsbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 159 days.

(21) Appl. No.: 18/293,228

(22) PCT Filed: Aug. 8, 2022

(86) PCT No.: PCT/EP2022/072207
§ 371 (c)(1),
(2) Date: Jan. 29, 2024

(87) PCT Pub. No.: WO2023/020868
PCT Pub. Date: Feb. 23, 2023

(65) Prior Publication Data

US 2024/0250584 A1 Jul. 25, 2024

(30) Foreign Application Priority Data

Aug. 19, 2021 (DE) ..................... 10 2021 209 125.3

(51) Int. Cl.
*H02K 11/01* (2016.01)
*H02K 11/225* (2016.01)
(Continued)

(52) U.S. Cl.
CPC ....... *H02K 11/0141* (2020.08); *H02K 11/225* (2016.01); *H02K 11/40* (2016.01); (Continued)

(58) Field of Classification Search
CPC .. H02K 11/0141; H02K 11/225; H02K 11/40; H02K 2211/03; H02K 11/21; H02K 11/33
(Continued)

(56) References Cited

U.S. PATENT DOCUMENTS

2008/0211356 A1 9/2008 Kataoka et al.
2018/0375405 A1 12/2018 Saito
(Continued)

FOREIGN PATENT DOCUMENTS

CN 208939772 U 6/2019
DE 102011089047 A1 6/2012
(Continued)

OTHER PUBLICATIONS

International Search Report for PCT/EP2022/072207, Issued Nov. 18, 2022.

*Primary Examiner* — Christopher M Koehler
*Assistant Examiner* — Viswanathan Subramanian
(74) *Attorney, Agent, or Firm* — NORTON ROSE FULBRIGHT US LLP

(57) ABSTRACT

A drive device. The drive device includes an electric machine arranged in a housing, a rotor of the electric machine being arranged on a drive shaft for conjoint rotation therewith, the drive shaft being rotatably mounted in the housing, and including a sensor unit that is configured to sense a rotary position of the rotor, the sensor unit being provided with a circuit board having at least one sensor element, and the circuit board being in the form of an annular disk and being arranged coaxially to an axis of rotation of the drive shaft. The circuit board is arranged in the housing, and the drive device includes a shielding sheet which radially surrounds at least some parts of the circuit board.

10 Claims, 2 Drawing Sheets

(51) Int. Cl.
*H02K 11/40* (2016.01)
*B60T 13/74* (2006.01)
*H02K 5/173* (2006.01)

(52) U.S. Cl.
CPC ............ *B60T 13/745* (2013.01); *H02K 5/173* (2013.01); *H02K 2211/03* (2013.01)

(58) Field of Classification Search
USPC ............................................................ 310/68
See application file for complete search history.

(56) References Cited

U.S. PATENT DOCUMENTS

| | | | |
|---|---|---|---|
| 2019/0326799 A1 | 10/2019 | Kaneko et al. | |
| 2020/0039495 A1* | 2/2020 | Henning | B60T 13/167 |
| 2020/0191616 A1 | 6/2020 | Islam et al. | |
| 2021/0159763 A1 | 5/2021 | Wolfram | |
| 2023/0033633 A1* | 2/2023 | Lerchenmueller | F16D 65/16 |

FOREIGN PATENT DOCUMENTS

| | | |
|---|---|---|
| EP | 2107669 A2 | 10/2009 |
| EP | 3705851 A1 | 9/2020 |
| JP | H03111153 U | 11/1991 |
| JP | 2018042332 A | 3/2018 |
| JP | 2020031466 A | 2/2020 |

* cited by examiner 44
41
35
42
42
43
18
21
40
39
33
32
37
27
38
34
25
26
36
24
23

SHIELDING STRUCTURE FOR A DRIVE DEVICE, PRESSURE GENERATOR FOR A BRAKE SYSTEM

FIELD

The present invention relates to a drive device comprising an electric machine arranged in a housing, a rotor of the electric machine being arranged on a drive shaft for conjoint rotation therewith, the drive shaft being rotatably mounted in the housing, and including a sensor unit that is configured to sense a rotary position of the rotor, the sensor unit being provided with a circuit board having at least one sensor element, and the circuit board being in the form of an annular disk and being arranged coaxially to an axis of rotation of the drive shaft.

The present invention also relates to a pressure generator for a brake system comprising such a drive device.

BACKGROUND INFORMATION

Drive devices of the type mentioned at the outset are available in the related art. In the case of a drive device comprising an electric machine, the electric machine is typically arranged in a housing of the drive device. As a rule, a rotor of the electric machine is arranged on a drive shaft for conjoint rotation therewith, the drive shaft being rotatably mounted in the housing. The arrangement of the rotor on the drive shaft means that the drive shaft can be driven or rotated by the electric machine. A rotation of the drive shaft can in turn actuate a working machine that is operatively connected to the drive shaft, such as a pump device. It is conventional to sense a rotary position of the rotor by means of a sensor unit, which has a circuit board having at least one sensor element. A circuit board is often used, which is in the form of an annular disk and arranged coaxially to the axis of rotation of the drive shaft. This type of design or arrangement of the circuit board allows the circuit board to be integrated into the drive device in a way that saves installation space. The sensor unit is an inductive sensor, for example, and so the sensor element then has at least one receiver coil configured on the circuit board.

SUMMARY

In a drive device according to an example embodiment of the present invention, the circuit board is arranged in the housing, and the drive device includes a shielding sheet which radially surrounds at least some parts of the circuit board. Since the circuit board is arranged in the housing, the drive device is particularly compact. However, due to the arrangement in the housing, the circuit board is in close proximity to electrically conductive lines that extend through the interior of the housing. During operation of the drive device, such lines can interfere with the function of the sensor unit due to capacitive effects. Typically, the sensor unit has at least one electronic component arranged on the circuit board, such as an application-specific integrated circuit (ASIC). Such electronic components are particularly susceptible to interference due to capacitive effects. The shielding sheet according to the present invention shields the circuit board and the elements arranged or configured on the circuit board, so that interference due to capacitive effects is at least reduced. The shielding sheet is preferably made of a copper material. This achieves particularly effective shielding of the circuit board. Since the circuit board is arranged in the housing, at least one portion of the shielding sheet radially surrounding the circuit board is also arranged in the housing. Preferably, the circuit board lies axially opposite the rotor or a measuring transducer coupled to the rotor for conjoint rotation therewith. If such a measuring transducer is present, the sensor unit is preferably configured to sense the rotary position of the rotor by sensing the rotary position of the measuring transducer. When the terms "axial" and "radial" are used in the context of the disclosure, such terms refer to the axis of rotation of the drive shaft, unless a different reference is expressly disclosed. Preferably, the shielding sheet is radially spaced from the circuit board.

According to a preferred embodiment of the present invention, the shielding sheet completely surrounds the circuit board radially. Thus, the course of the shielding sheet is closed in the peripheral direction. Such a design of the shielding sheet achieves particularly effective shielding of the circuit board.

According to a preferred embodiment of the present invention, the shielding sheet is fastened to the housing. This is advantageous in terms of a stable fastening of the shielding sheet. The shielding sheet is preferably fastened directly to the housing. An advantage of this is that an electrically conductive connection is established between the shielding sheet and the metal housing, so that the shielding sheet can be connected to an electrical ground connection by means of the housing. The shielding sheet is particularly preferably fastened to the housing by a form-fitting connection. According to an alternative embodiment, the shielding sheet is fastened to a rotatably mounted element of the drive device, for example to the rotor or to the drive shaft.

According to a preferred embodiment of the present invention, the shielding sheet has at least one bending tab and is fastened to the housing by the bending tab. A form-fitting connection is technically simple to establish by means of a bending tab. For this purpose, a housing portion of the housing has an opening, for example, wherein the bending tab is guided through the opening and engages behind the housing portion for the form-fitting fastening of the shielding sheet. As an alternative to fastening by means of the at least one bending tab, the shielding sheet can also be fastened to the housing in another way. According to a further embodiment, the shielding sheet is fastened to the housing, for example by caulking.

Preferably, according to an example embodiment of the present invention, the shielding sheet is fastened to an end shield of the housing. An end shield is a housing cover of the housing, via which the drive shaft is rotatably mounted. Typically, an end shield carries a pivot bearing to support the drive shaft. Preferably, the circuit board is arranged between the end shield on one side and the rotor or the measuring transducer on the other side.

Preferably, according to an example embodiment of the present invention, the electric machine has a stator having an in particular multi-phase motor winding, wherein the motor winding is electrically connected or connectable to an electrical energy store by at least one electrically conductive motor phase supply line, and wherein the shielding sheet is arranged radially between the circuit board on one side and the at least one motor phase supply line on the other side. During operation of the drive device, high voltage gradients are typically present on the motor phase supply line, which can, in principle, lead to a pronounced malfunction of the sensor unit due to capacitive effects. In this respect, the arrangement of the shielding sheet radially between the circuit board on one side and the motor phase supply line on the other side is particularly advantageous in terms of effective shielding of the circuit board. Preferably, the drive device has an interconnection plate that is arranged so as to be fixed to the housing, wherein the interconnection plate radially surrounds the shielding sheet, and wherein the motor phase supply line extends through the interconnection plate.

According to a preferred embodiment of the present invention, the drive device has a carrier element that is fastened to the housing and carries the circuit board, and the carrier element has the shielding sheet. Thus, the shielding sheet is part of the carrier element. A carrier element for fastening the circuit board to the housing is typically present in any event. Thus, the integration of the shielding sheet into the carrier element does not increase the total number of components present.

According to a preferred embodiment of the present invention, the carrier element has a main body made of plastics material and the shielding sheet is electrically separated from the circuit board by the main body. This prevents an electrical short circuit between the shielding sheet on one side and conductor tracks configured on the circuit board on the other side. Preferably, the circuit board is fastened to the main body, so that the main body of the carrier element supports the circuit board. Preferably, at least one portion of the shielding sheet extends through the main body made of plastics material.

Preferably, according to an example embodiment of the present invention, the carrier element is fastened to the housing by the shielding sheet. The shielding sheet is particularly suitable for this purpose, due to its mechanical robustness. In addition, Substitute Specification contact between the housing and the shielding sheet is desirable in any event in order to establish an electrically conductive connection between the shielding sheet and the housing.

According to a preferred embodiment of the present invention, the shielding sheet has a first portion extending at least substantially in the axial direction and a second portion extending at least substantially in the radial direction, wherein the first portion radially surrounds at least some parts of the circuit board, and wherein the second portion covers at least some parts of the circuit board. Thus, the circuit board is not only shielded in the radial direction, but also in the axial direction, specifically by the second portion covering at least some parts of the circuit board.

The pressure generator for a brake system according to the present invention has a pump device, a drive device for actuating the pump device and a control unit for controlling the drive device. The pressure generator is characterized by the features of the drive device according to the present invention. This also results in the advantages already mentioned. Further preferred features and combinations of features result from what was described above and from the rest of the disclosure herein.

According to a preferred embodiment of the present invention, the shielding sheet is electrically connected to an electrical ground connection of the control unit. This allows capacitive effects that arise during operation of the drive device to be dissipated by means of the shielding sheet. Preferably, the electrical connection between the shielding sheet and the ground connection is provided at least in part by the housing of the drive device and a housing of the pump device.

BRIEF DESCRIPTION OF THE DRAWINGS

The present invention is explained in more detail below with reference to the figures.

DETAILED DESCRIPTION OF EXAMPLE EMBODIMENTS

Figure 1:
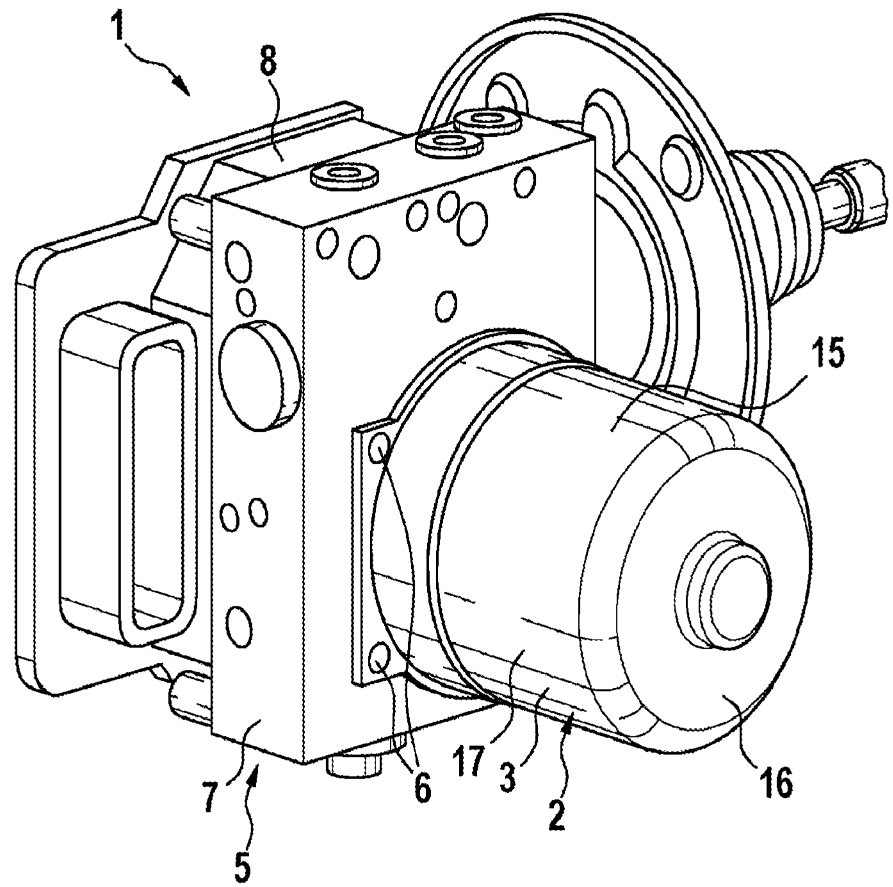
FIG. 1 shows a simplified representation of a pressure generator for a brake system, according to an example embodiment of the present invention.

FIG. 1 shows a simplified representation of a pressure generator 1 for a hydraulic brake system of a motor vehicle. The pressure generator 1 has an electric drive device 2. The drive device 2 has a housing 3, which in the present case has a circular cross-section. In addition, the drive device 2 has an electric machine 4. The electric machine 4 is arranged in the housing 3 and is therefore not visible in FIG. 1. As a working machine, the pressure generator 1 has a pump device 5 having at least one fluid pump. The housing 3 of the drive device 2 is fastened to a housing 7 of the pump device 5 by a plurality of fastening means 6. The drive device 2 is configured to actuate the at least one fluid pump of the pump device 5 by means of the electric machine 4. In addition, the pressure generator 1 has a control unit 8 for controlling the electric machine 4. The pump device 5 is arranged between the drive device 2 on one side and the control unit 8 on the other side.

Figures 2, 3:
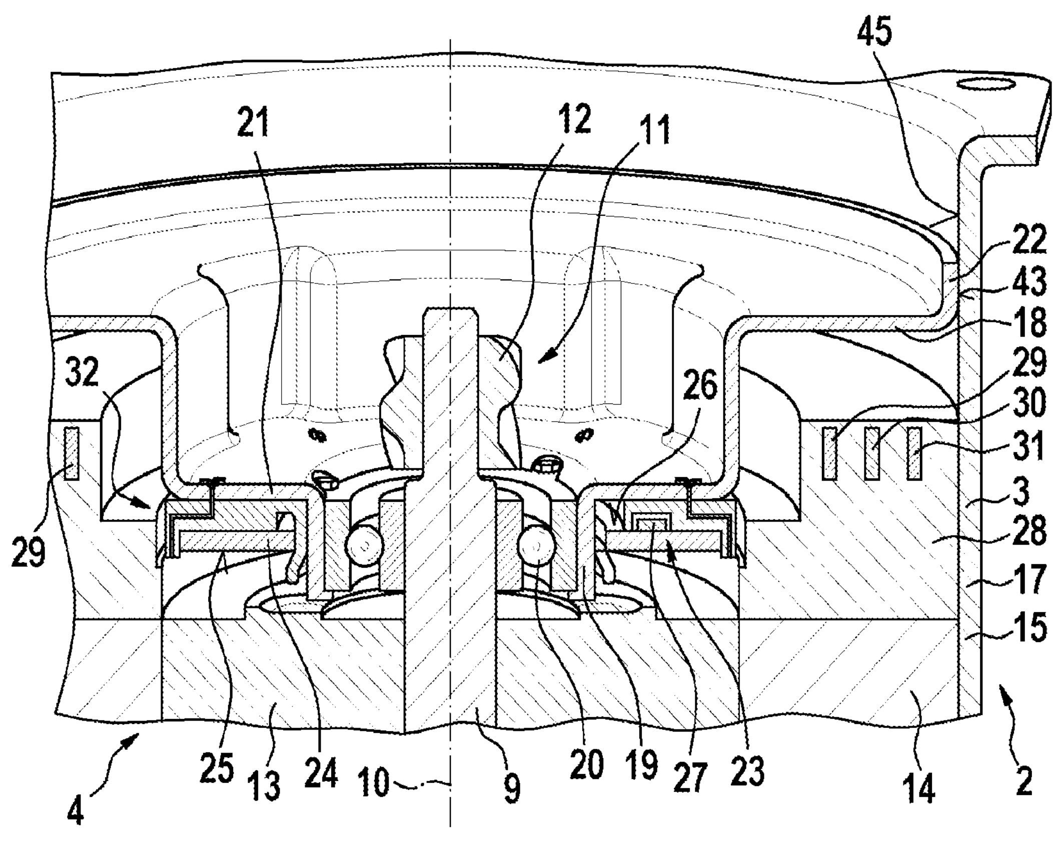
FIG. 2 is a sectional view of a drive device of the pressure generator according to an example embodiment of the present invention.
FIG. 3 is a further sectional view of the drive device, according to an example embodiment of the present invention.

FIG. 2 is a sectional view of the drive device 2. As can be seen from FIG. 2, the drive device 2 has a drive shaft 9, which is mounted in the housing 3 so that it can rotate about an axis of rotation 10. The drive shaft 9 is operatively connected to the at least one fluid pump of the pump device 5 by a transmission device 11. With regard to the transmission device 11, FIG. 2 only shows a spur gear 12 of the transmission device 11, which gear is arranged on the drive shaft 9 for conjoint rotation therewith. Preferably, however, the transmission device 11 is configured as a planetary gearbox.

The electric machine 4 has a rotor 13 arranged on the drive shaft 9 for conjoint rotation therewith and a stator 14 arranged so as to be fixed on the housing. The stator 14 has a multiphase motor winding, not shown for reasons of clarity, which is arranged so as to be distributed around the rotor 13 in such a way that the rotor 13 and thus the drive shaft 9 can be rotated or driven by a suitable current supply to the motor winding.

The housing 3 has a stator tube 15, which carries the stator 14. The stator tube 15 is made of a metal material. As can be seen from FIG. 1, the stator tube 15 is cup-shaped. In this respect, the stator tube 15 has a base 16 and a sleeve portion 17. The base 16 extends at least substantially radially. The sleeve portion 17 extends at least substantially axially from the base 16.

The housing 3 also has an end shield 18. The end shield 18 covers the electric machine 4 and in this respect forms a housing cover for the housing 3. The end shield 18 is made of a metal material, in the present case by means of deep drawing. The end shield 18 is configured to support the drive shaft 9. For this purpose, the end shield 18 has a sleeve-shaped bearing portion 19 extending in the axial direction. A pivot bearing 20, which in the present case is a rolling body bearing 20, is arranged between the bearing portion 19 and the drive shaft 9.

The end shield 18 also has a housing portion 21 in the form of an annular disk extending in a radial direction. In the present case, the housing portion 21 is directly adjacent to the bearing portion 19.

The end shield 18 also has a sleeve-shaped fastening portion 22 extending in the axial direction. A radially outwardly directed lateral surface 43 of the fastening portion 22 lies radially against a radially inwardly directed lateral surface 45 of the stator tube 15. In the present case, the end shield 18 is pressed into the stator tube 15 in such a way that a frictional connection is formed between the fastening portion 22 and the stator tube 15. However, the end shield 18 can also be fastened to the stator tube 15 by other types of fastening, for example by an adhesive connection, by a welded connection or by at least one fastening means.

The drive device 2 also has a sensor unit 23, which is configured to sense a rotary position of the rotor 13. The sensor unit 23 has a circuit board 24 in the form of an annular disk, which is arranged in the housing 3. The circuit board 24 is arranged coaxially to the axis of rotation 10 of the drive shaft 9, so that the circuit board 24 radially surrounds the drive shaft 9. In the present case, the circuit board 24 is arranged between the housing portion 21 of the end shield 18 on one side and the rotor 13 on the other side. The circuit board 24 has a first end face 25 facing the rotor 13 and a second end face 26 facing the housing portion 21. A sensor element of the sensor unit 23 is arranged or configured on the first end face 25. In the present case, the sensor unit 23 is configured as an inductive sensor 23. For this purpose, the sensor element has at least one transmitter coil and at least one receiver coil, wherein the transmitter coil and the receiver coil are configured as conductor tracks on the circuit board 23. An electronic component 27 of the sensor unit 23 is arranged on the second end face 26 of the circuit board 24 facing the housing portion 18. In the present case, the electronic component 27 is an application-specific integrated circuit (ASIC). The electronic component 27 is configured to demodulate or process the sensor signal of the sensor element.

According to a further exemplary embodiment, the drive device 2 has a measuring transducer coupled to the rotor 13 for conjoint rotation therewith and the circuit board 24 is arranged between the housing portion 21 of the end shield 18 on one side and the measuring transducer on the other side. In this exemplary embodiment, the sensor unit 23 is then configured to sense the rotary position of the rotor 13 by sensing a rotary position of the measuring transducer.

The drive device 2 also has an interconnection plate 28 arranged so as to be fixed to the housing. The interconnection plate 28 is annular and radially surrounds the sensor unit 23. A plurality of electrically conductive motor phase supply lines 29, 30 and 31 extend through the interconnection plate 28. The motor phase supply lines 29, 30 and 31 are only shown in simplified form in FIG. 2. If the pressure generator 1 shown in FIG. 1 is installed in a brake system, the phases of the motor winding of the stator 14 are electrically connected to an electrical energy store by the motor phase supply lines 29, 30 and 31.

The drive arrangement 2 also has a carrier element 32 for fastening the circuit board 24 to the end shield 18. The design of the carrier element 32 is explained in more detail below with reference to FIG. 3. FIG. 3 is a sectional view of a section of the drive device 2 in the region of the carrier element 32.

The carrier element 32 has a main body 33 made of plastics material. The circuit board 24 is fastened to the main body 33, for example by a snap-in connection. The main body 33 is annular and is arranged coaxially to the axis of rotation 10 of the drive shaft 9. The main body 33 has a first portion 34 that radially surrounds the circuit board 24. Thus, the first portion 34 extends in the peripheral direction of the circuit board 24 completely around the circuit board 24. The main body 33 also has a second portion 35. The second portion 35 at least substantially covers the circuit board 24. Accordingly, the second portion 35 is arranged between the circuit board 24 on one side and the housing portion 21 of the end shield 18 on the other side. In the region of the second portion 35, the main body 33 has a material recess 36 or a cavity 36, wherein the electronic component 27 is arranged in the material recess 36 or the cavity 36.

The carrier element 32 also has a shielding sheet 37, which in the present case extends through the main body 33 and is form-fittingly connected to the main body 33. Preferably, the shielding sheet 37 is made of a copper material. The main body 33 and the shielding sheet 37 are configured in such a way that the shielding sheet 37 is electrically separated from the circuit board 24 by the main body 33.

In the present case, the shielding sheet 37 has a first portion 38 extending in the axial direction. The first portion 38 radially surrounds the circuit board 24. Accordingly, the first portion 38 is sleeve-shaped. The first portion 38 of the shielding sheet 38 is arranged radially between the circuit board 24 on one side and the interconnection plate 28 or the motor phase supply lines 29, 30 and 31 on the other side.

In the present case, the shielding sheet 37 also has a second portion 39 extending in a radial direction. The second portion 39 is in the form of an annular disk and extends radially inwards from the first portion 38. The second portion 39 covers some parts of the circuit board 24, and therefore the second portion 39 lies axially opposite some parts of the circuit board 24.

In the present case, the shielding sheet 37 also has a third portion 40 extending in the axial direction. The third portion 40 protrudes from the main body 33. Two bending tabs 42 are provided at a free end 41 of the third portion 40. The bending tabs 42 are guided through an axial opening 43 of the housing portion 21 of the end shield 18 and engage behind the housing portion 21, in order to fasten the carrier element 32 to the end shield 18 by means of a form-fitting connection 44. As can be seen from FIG. 2, in addition to the third portion 40 shown in FIG. 3, there are further third portions 40, in each case with two bending tabs 42, wherein the third portions 40 are distributed in the peripheral direction of the shielding sheet 37. By way of example only, the housing portion 21 has six axial openings 43, wherein the shielding sheet 37 has six third portions 40, in each case with two bending tabs 42, and wherein the bending tabs 42 of a different third portion 40 are passed through each of the axial openings 43.

If the drive device 2 is part of the pressure generator 1 as shown in FIG. 1, the shielding sheet 37 is electrically connected to a ground connection of the control unit 8. This electrical connection is provided at least in part by the end shield 18, the stator tube 15, the fastening means 6 and the housing 7 of the pump device 5.

The shielding sheet 37 shields the sensor unit 23 and in particular the electronic component 27 from the motor phase supply lines 29, 30 and 31. This prevents the motor phase supply lines 29, 30 and 31 from interfering with the function of the sensor unit 23 due to capacitive effects during operation of the drive device 2.

The invention claimed is:

1. A drive device, comprising:

an electric machine arranged in a housing, a rotor of the electric machine being arranged on a drive shaft for conjoint rotation with the drive shaft, the drive shaft being rotatably mounted in the housing;

a sensor unit configured to sense a rotary position of the rotor, the sensor unit including a circuit board having at least one sensor element, and the circuit board being in the form of an annular disk and being arranged coaxially to an axis of rotation of the drive shaft, wherein the circuit board is arranged in the housing;

a shielding sheet which radially surrounds at least some parts of the circuit board; and a carrier element that is fastened to the housing and carries the circuit board, the carrier element having the shielding sheet, wherein the carrier element has a main body made of plastics material, and the shielding sheet is electrically separated from the circuit board by the main body.

2. The drive device according to claim 1, wherein the shielding sheet completely surrounds the circuit board radially.

3. The drive device according to claim 1, wherein the shielding sheet is fastened to the housing by a form-fitting connection.

4. The drive device according to claim 3, wherein the shielding sheet has at least one bending tab and is fastened to the housing by the bending tab.

5. The drive device according to claim 3, wherein the shielding sheet is fastened to an end shield of the housing.

6. The drive device according to claim 1, wherein the electric machine includes a stator having a multi-phase motor winding, wherein the motor winding is electrically connected or connectable to an electrical energy store by at least one electrically conductive motor phase supply line, and wherein the shielding sheet is arranged radially between the circuit board on one side and the motor phase supply line on the other side.

7. The drive device according to claim 1, wherein the shielding sheet has a first portion extending at least substantially in the axial direction and a second portion extending at least substantially in the radial direction, wherein the first portion radially surrounds at least some parts of the circuit board, and wherein the second portion covers at least some parts of the circuit board.

8. A drive device, comprising:

an electric machine arranged in a housing, a rotor of the electric machine being arranged on a drive shaft for conjoint rotation with the drive shaft, the drive shaft being rotatably mounted in the housing;

a sensor unit configured to sense a rotary position of the rotor, the sensor unit including a circuit board having at least one sensor element, and the circuit board being in the form of an annular disk and being arranged coaxially to an axis of rotation of the drive shaft, wherein the circuit board is arranged in the housing;

a shielding sheet which radially surrounds at least some parts of the circuit board; and a carrier element that is fastened to the housing and carries the circuit board, the carrier element having the shielding sheet, wherein the carrier element is fastened to the housing by the shielding sheet.

9. A pressure generator for a brake system, comprising:

a pump device;

a drive device configured to actuate the pump device; and a control unit configured to controlling the drive device;

wherein the drive device includes:

an electric machine arranged in a housing, a rotor of the electric machine being arranged on a drive shaft for conjoint rotation with the drive shaft, the drive shaft being rotatably mounted in the housing, a sensor unit configured to sense a rotary position of the rotor, the sensor unit including a circuit board having at least one sensor element, and the circuit board being in the form of an annular disk and being arranged coaxially to an axis of rotation of the drive shaft, wherein the circuit board is arranged in the housing, a shielding sheet which radially surrounds at least some parts of the circuit board, and a carrier element that is fastened to the housing and carries the circuit board, the carrier element having the shielding sheet, wherein the carrier element has a main body made of plastics material, and the shielding sheet is electrically separated from the circuit board by the main body.

10. The pressure generator according to claim 9, wherein the shielding sheet is electrically connected to an electrical ground connection of the control unit.

* * * * *